United States Patent [19]
Sommer

[11] 4,377,222
[45] Mar. 22, 1983

[54] DRIVE SYSTEM

[75] Inventor: Gordon M. Sommer, Boca Raton, Fla.

[73] Assignee: Sommer Co., Warren, Mich.

[21] Appl. No.: 58,106

[22] Filed: Jul. 16, 1979

[51] Int. Cl.³ .................. F16D 25/11; F16D 67/00; B60K 41/00; F16D 43/30

[52] U.S. Cl. .................. 192/0.02 R; 192/0.032; 192/0.098; 192/54; 192/103 F; 74/661; 74/665 B; 192/87.1

[58] Field of Search .............. 192/0.032, 0.098, 0.076, 192/0.075, 0.033, 3 N, 54, 3.57, 87.12, 87.13, 0.02 R, 87.1, 3.58, 103 F, 0.02; 74/665 B, 661, 847, 857

[56] References Cited

U.S. PATENT DOCUMENTS

| | | | |
|---|---|---|---|
| 2,802,153 | 8/1957 | Bonn | 192/0.02 R |
| 3,369,636 | 2/1968 | Nelson | 192/0.098 X |
| 3,429,406 | 2/1969 | Cary | 192/0.034 |
| 3,512,425 | 5/1970 | Endo | 74/665 B |
| 3,576,106 | 4/1971 | Nowicki | 74/661 X |
| 3,648,808 | 3/1972 | Kato | 192/0.033 |
| 3,692,157 | 9/1972 | Arnold et al. | 192/0.098 |
| 3,734,257 | 5/1973 | Eastcott et al. | 192/0.02 R |
| 3,752,284 | 8/1973 | Brittain et al. | 192/103 C |
| 3,757,912 | 9/1973 | Ball et al. | 192/0.098 X |
| 4,298,113 | 11/1981 | Shaver et al. | 192/0.094 |

Primary Examiner—George H. Krizmanich
Attorney, Agent, or Firm—Harness, Dickey & Pierce

[57] ABSTRACT

A drive system particularly suited for use in conjunction with a grinding mill is disclosed herein with a hydraulically actuated clutch of the oil shear type for transmission of driving forces to the grinding mill. A control system is also provided for selectively controlling the drive system and is operative to automatically accelerate the grinding mill up to full operating speed, to establish and maintain synchronization between multiple drive trains, and to provide a variety of operational modes including an inching capability, reduced speed operation, pendulum damping capability, and overload protection.

32 Claims, 3 Drawing Figures

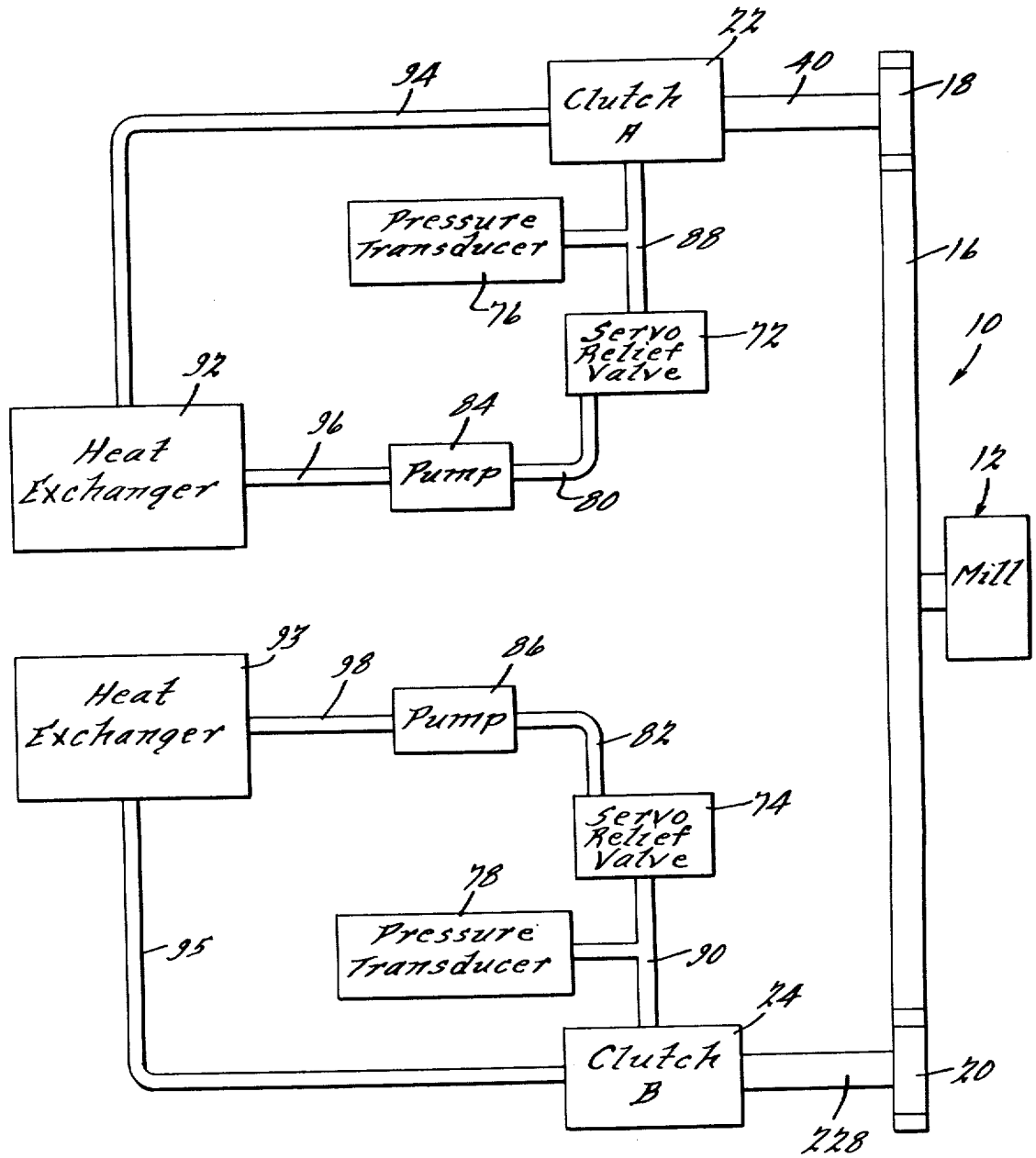

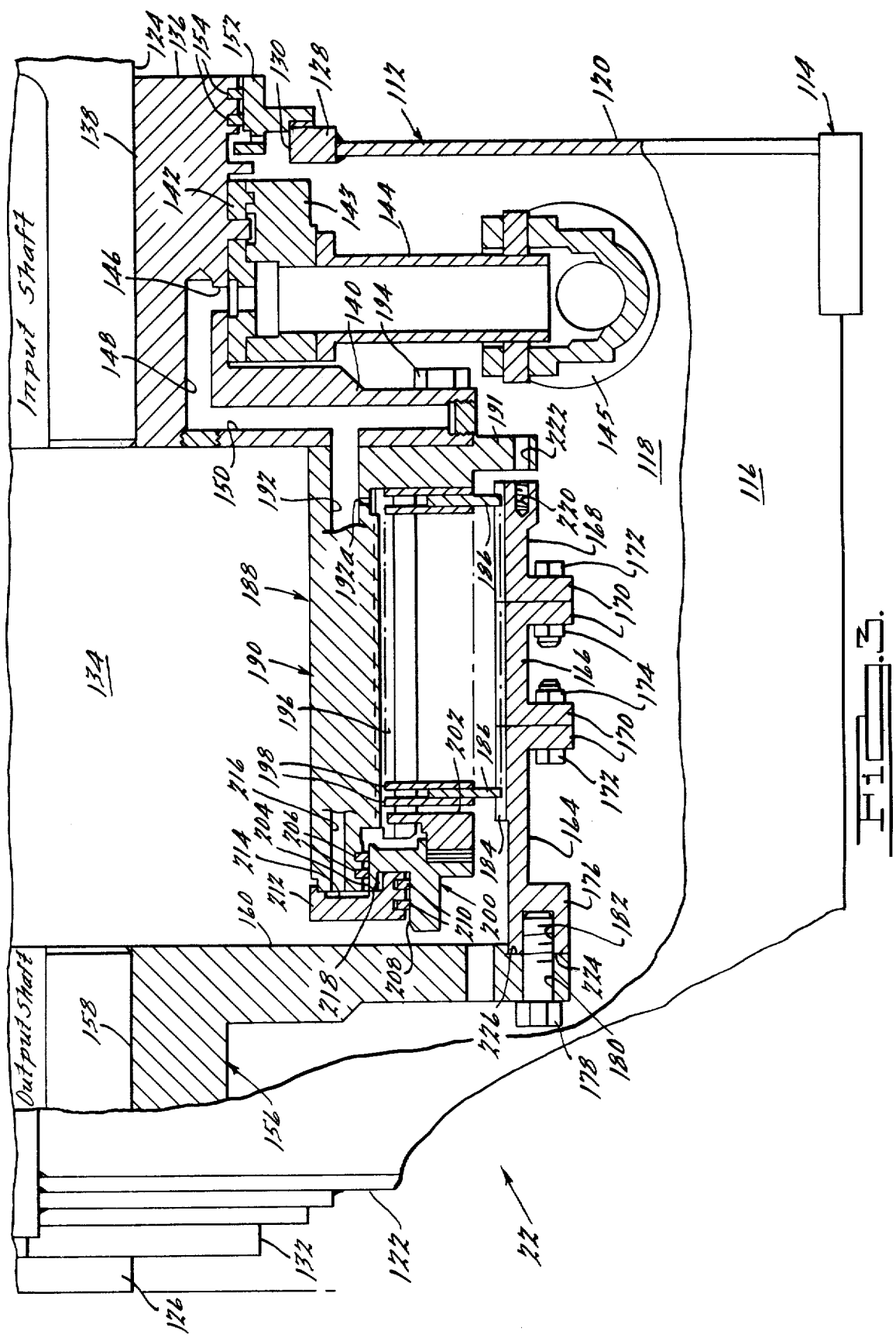

DRIVE SYSTEM

BACKGROUND AND SUMMARY OF THE INVENTION

This invention is directed to a power transmission arrangement and in particular to the provision of a multipowered heavy duty drive system incorporating hydraulic clutches and associated controls particularly adapted for use in conjunction with large grinding mills.

As the capacity of large scale grinding mills such as ball, rod or autogenous mills is increased, it becomes increasingly difficult to provide an efficient trouble free drive system therefor of sufficient size. Accordingly, it has become common to employ twin drive systems operative to drive a single mill. Such drive systems incorporate higher power electric motors such as synchronous motor for example and have utilized air actuated clutches in order to permit synchronization of the drive motors. Such a drive system is disclosed in Nelson, U.S. Pat. No. 3,369,636.

While such air actuated clutches are suited for use in rapidly accelerating the mill up to and maintaining operation at full speed, their limited heat dissipation capability severely limits the frequency, duration, and extent of clutch actuation.

In the operation of such mills certain novel phases of activity could be achieved by provision of a greatly enhanced clutching capability over that presently afforded by air clutches. Included in these desired activities is the angular repositioning of the mill drum by inching to permit servicing or replacement of the mill liners.

The provision of a hydraulic clutch or clutches of the wet plate type referred to as wet clutch, having an external coolant circuit or circuits introduce certain unobvious advantages over the previously known use of air clutches and provide the flexibility to incorporate substantially increased flexibility into the operational modes of the grinding mill control systems.

Thus, the wet clutch may be utilized in a distinctly different manner by incorporating in its control program for normal running a closely toleranced overload setting, at which the clutch will slip, to thus limit the gross value of torque which may be transmitted. An alarm or an automatic shutdown or automatic mill off loading arrangement also can be incorporated with this control mode. Thus, once clutch lock up occurs the torque transmission capability could be increased to a suitable preselected value above normal full load torque but below the maximum torque transmission capability to the drive systems components. This limit of maximum torque load affords protection of the reduction gear or gears and other drive system components against damage due to overload. One previous solution to this problem of over-torquing relied upon shear pins installed in combination with a solid coupling. However, this prior arrangement suffered from the disadvantage that shear pin failure could occur due to fatigue, as distinct from torque overload, without approaching the pre-set value for overload. Thus, failure of a shear pin by fatigue, as distinct from torque overload, could cause the expense of a mill shutdown and require the expenditure of time and labor for refitting of a new shear pin or pins. This is unduly time consuming and costly in light of the production loss suffered by mill shutdown.

A further novel function for the system, made possible by the heat dissipation characteristics of the wet clutch, is the provision of an inching drive wherein the driving motor or motors may be connected in driving relation to the mill through the clutches under a slip condition for a predetermined limited period of time, in order to achieve a limited predetermined degree of mill rotation. The period of clutch activation and the degree of slip may be selectively varied.

Alternatively, pulsed inching can be achieved by cyclically engaging and disengaging the clutch so as to provide a slow, pulsed forward motion.

This is of particular value in carrying out mill maintenance, such as servicing or changing mill liners, wherein it is sometimes necessary for the maintenance crew to replace liners within the mill while standing upon the charge. The capability of precise inching to a predetermined degree of rotation affords a significant economic advantage in reducing mill downtime required for such periodic servicing.

A further desirable capability for such mills is the ability to rapidly stop and lock the mill drum against rotational movement such as for servicing, recharging or the like. Controlled energization of the clutch or clutches can be employed to effect a braking action to thereby minimize the duration of pendulum-like oscillating motion often encountered during mill shutdown. This can also significantly speed up the repositioning of the drum during internal maintenance and service work, and enhance safety.

It is further contemplated, that while continuous clutch slip is generally to be avoided on the grounds of obtaining efficient energy utilization, in certain circumstances where the mill charge received from the mine varies outside generally accepted tolerances so as to adversely affect mill operation, short term corrective action can be taken by permitting a selected degree of clutch slip while maintaining operation of the driving motors at normal operating speed.

By making provision for clutch cooling to a greater extent than is normally considered necessary, mill rotation at 90% or even 80% of the normal operational speed is made possible, while maintaining full speed operation of the motor.

The present invention thus provides a drive arrangement for use with a grinding mill having a drum mounted for rotation on bearing means, a driven gear secured to the drum, at least one pinion supported in driving relation with the driven gear, and electric motor means comprising wet clutch means interposed in selective connecting relation between the motor means and the pinion, the wet clutch means including a coolant circuit to dissipate heat generated in the clutch means, and mill control means including a clutch control circuit.

The invention further provides inching means to control the actuation of the wet clutch for a controlled period of time, to provide a selectively variable or a predetermined extent of rotation of the drum by the electric motor.

The invention also includes the provision of braking means to immobilize the output half of the clutch whereby subsequent to actuation of the wet clutch a braking torque is applied to the mill drum to bring it to a standstill.

The foregoing provisions of load monitoring, load balancing and load limiting may be effected utilizing a suitable electrical and electrohydraulic load monitoring and control circuits which preferably will be of solid state construction and may employ a micro-process computer to selectively control operation of the clutch. The controller circuits can be designed to provide an automatic controlled rate of mill acceleration, from standstill, by monitoring motor load and modulating the respective clutch load control pressures accordingly both to control the loading rate and to maintain load balance of multiple motors of a multiple drive system within predetermined limits.

In accordance with one embodiment of the invention, upon the occurrence of load imbalance between the two motors, beyond a predetermined limit during normal running, the clutches are depressurized to a sufficient extent that continuous slippage occurs whereat the speed of mill rotation may decrease by a value such as 5% of operating speed. With the mill thus operating at about 95% full speed for instance, one of the clutches is modulated so as to equalize the loading of the motors and an acceleration schedule then initiated to bring the mill back up to full speed.

Additional advantages and features of the present invention will become apparent from the subsequent description and the appended claims taken in conjunction with the accompanying drawings.

BRIEF DESCRIPTION OF THE DRAWINGS

FIG. 2 is another schematic diagram of a portion of the drive system of FIG. 1 illustrating the fluid flowpaths associated with operation of the clutches, all in accordance with the present invention; and FIG. 3 is a sectional view of a clutch for use in the drive system of FIGS. 1 and 2, the section being taken along an axially extending plane passing through the axis of rotation of the clutch.

DESCRIPTION OF THE PREFERRED EMBODIMENT

Figure 1:
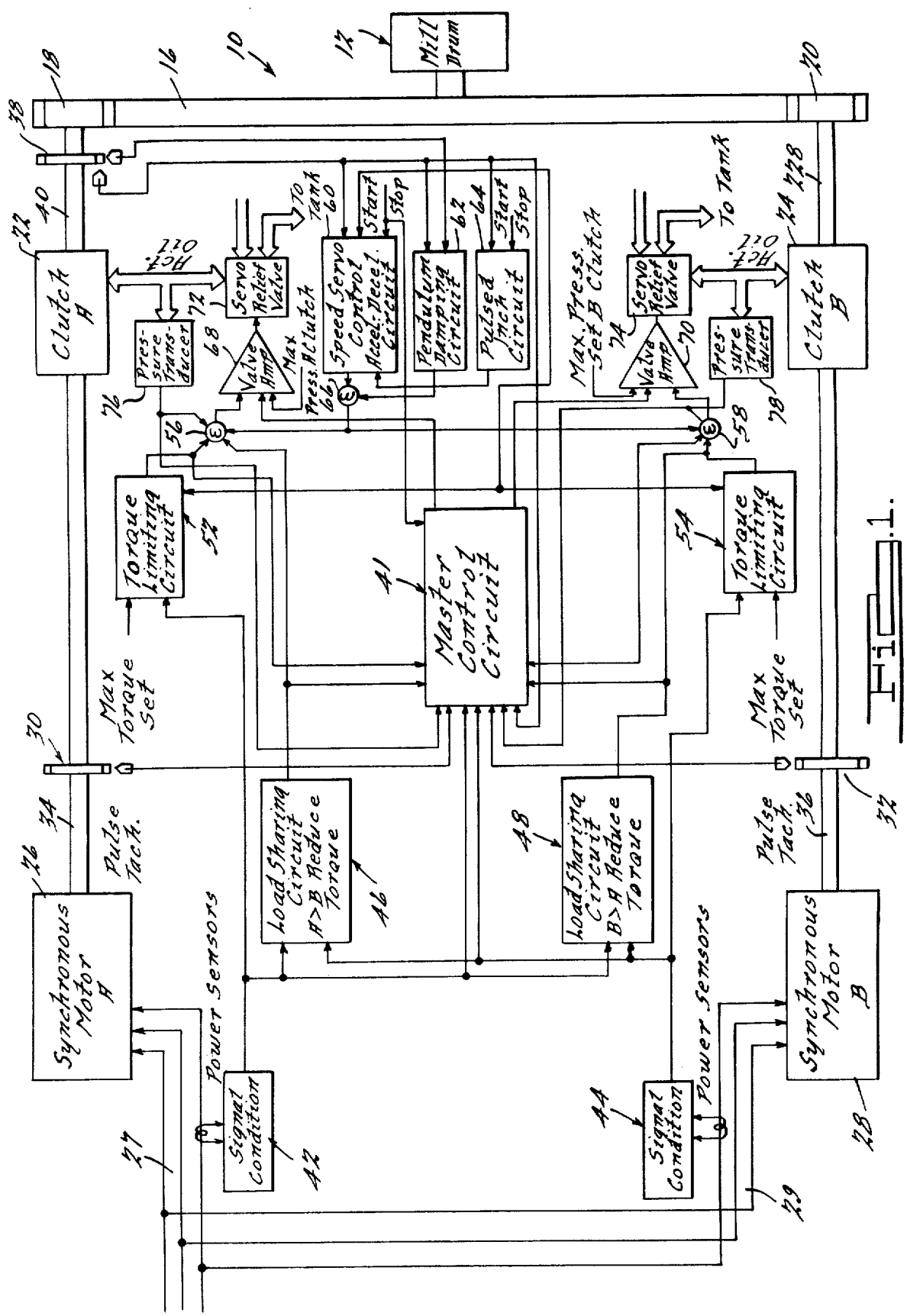
FIG. 1 is a schematic diagram of a drive system for a grinding mill in accordance with the present invention illustrating the control system therefor.

Referring now to the drawings and in particular to FIGS. 1 and 2, a grinding mill indicated generally at 10 has a gear wheel 16 secured in driving relation with a drum 12 and is mounted in meshing relation with separate twin drive pinions 18 and 20, each of which is connected by way of a wet clutch 22 and 24 with respective electric motors 26 and 28. Electric motors 26 and 28 may be of the synchronous type although it should be noted that other suitable types of motors may also be utilized. The motors 26 and 28 are energized by electrical supply circuits 27 and 29 which may include suitable control switches for actuation thereof.

Pulse tachometers 30 and 32 are provided on respective output shafts 34 and 36 of motors 26 and 28 and are operative to sense the rotational speed thereof. Also another pulse tachometer 38 is provided on the output shaft 40 of clutch 22 which is operative to sense both the speed and direction of rotation of shaft 40 which in turn will provide a measure of speed and direction of rotation of mill 10. The outputs of pulse tachometers 30 and 32 are connected to a master control circuit 41. Also, suitable motor power sensors 42 and 44 are connected in supply circuits 27 and 29 respectively which are operative to sense power consumption of respective motors 26 and 28. Preferably sensors 42 and 44 will be in the form of wattmeters although it should be noted that current transformers or other suitable sensing means may be utilized.

The output of each of the power sensors 42 and 44 is connected to the inputs of a pair of load sharing circuits 46 and 48, to master control circuit 41 and to respective torque limiting circuits 52 and 54.

The outputs of each of the load sharing circuits is supplied to respective summing elements 56 and 58 and to master control circuit 41.

Each of the torque limiting circuits 52 and 54 also has a settable input which may adjusted to limit maximum torque output of the respective motors 26 and 28, another input from master control circuit 41 and an output connected to respective summing elements 56 and 58 and to master control circuit 41.

The speed sensing output of pulse tachometer 38 is connected to a speed servo control circuit 60, a pendulum damping circuit 62, pulsed inch control circuit 64 and to master control circuit 41. The rotational direction output of pulse tachometer 38 is connected to pendulum damping circuit 62.

Speed servo control circuit 60 also has a manually operable start/stop control input as well as an input from master control circuit 41. Similarly, pulsed inch circuit 64 also has a manually operable start/stop control input and has an output connected to the speed servo control circuit 60. The output of speed servo control circuit 60 is connected to a summing element 66 which also receives the output from pendulum damping circuit 62 and is connected to each of respective summing elements 56 and 58.

The output of each of summing elements 56 and 58 is connected to the input of respective valve amplifier circuits 68 and 70 each of which also receive inputs from master control circuit 41. Each of the valve amplifiers 68 and 70 also include a settable maximum pressure limiting control which may be set to limit the maximum actuating pressure which may be applied to the respective clutches 22 and 24.

The valve amplifiers are each operative to control respective servo relief valves 72 and 74 which in turn control the flow of hydraulic fluid to respective clutches 22 and 24 and the actuating pressure applied thereto. Servo relief valves 72 and 74 and valve amplifiers 68 and 70 may be of the type disclosed in copending application Ser. No. 849,858, filed Nov. 9, 1977 entitled "Clutch Unit" and assigned to the same assignee as the present invention.

A pair of pressure transducers 76 and 78 are also provided which monitor the actuating pressure applied to each of the respective clutches. The output of each of pressure transducers 76 and 78 is connected to respective summing elements 56 and 58 and to master control circuit 41.

The hydraulic circuit of the present invention is illustrated diagrammatically in FIG. 2 and comprises supply lines 80 and 82 extending from fluid pumps 84 and 86 to and operative to supply a constant flow of fluid under pressure to respective servo relief valves 72 and 74 which in turn direct this fluid through respective clutches 22 and 24 via conduits 88 and 90 and are operative to exert a controlled actuating pressure thereon.

Thereafter, the fluid is conducted from respective clutches 22 and 24 to suitable heat exchangers 92 and 93 for cooling via conduits 94 and 95 and thence back to respective pumps 84 and 86 via fluid conduits 96 and 98. It should be noted that heat exchangers 92 and 94 may be of any suitable type such as air or water cooled and may also operate as storage reservoirs for the oil supply. Additionally, if desired, a separate tank may be provided to operate as a supply reservoir. Also, while as illustrated the system shown is fully redundant for each clutch, if desired, a single feed system may be employed to supply fluid to each of the clutches.

Preferably, the clutches employed in the drive system are of the oil shear type such as disclosed in copending application Ser. No. 849,857 entitled "Clutch Unit", filed Nov. 9, 1977 and assigned to the assignee of the present application. As clutches 22 and 24 are substantially identical in construction, only clutch 22 will be described in detail with reference to FIG. 3. Clutch 22 will include an exterior enclosure 112 having a base structure 114 adapted to be operatively supported upon a suitable support surface. The housing 112 includes laterally spaced side sections 116 and 118 and axially or longitudinally spaced end sections 120 and 122 that extend laterally between the side sections 116, 118. The end section 120 of the housing 112 is provided with an enlarged thickness annular section 128 which defines a generally circular opening 130 through which the driving shaft 124 extends. In a similar manner, the end section 122 of the housing 112 is provided with an annular section 132 which defines an opening (not shown) through which the driven shaft 126 extends. The aforesaid annular openings are communicable with an internal clutch chamber, generally designated by the numeral 134, within which the clutch actuating mechanism for drivingly connecting the driving shaft 124 with the driven shaft 126 is located as will hereinafter be described in detail.

As shown in FIG. 3, the driving shaft 124 is provided with an annular driving hub generally designated by the numeral 136 which defines a central, axially extending bore 38 within which the inner end of the driving shaft 124 is received. The hub 136 and shaft 124 are drivingly connected with one another by any suitable keyway means or the like whereby upon rotation of the driving shaft 124 the hub 136 will rotate concomitantly therewith. The driving hub 136 includes a radially outwardly extending inner end section generally designated by the numeral 140 and carries or supports an oil seal ring assembly 142 having a radially outwardly disposed section 143 which is communicable via a suitable oil supply conduit 144 with an oil manifold 145. The conduit 144 is communicable with a radial bore 146 in the driving hub 136 which in turn is communicable with an axially extending bore 148 and one or more radially outwardly extending fluid passages 150 formed in the radially outwardly extending section 140 of the hub 136. The manifold 145 is connected to a suitable source of cooling fluid (oil) via servo relief valve 72.

Disposed directly adjacent the annular section 128 is an annular grease seal ring 152 which is cooperable with taconite, for example, sealing elements 154 for providing the desired peripheral seal around the outer periphery of the hub 136. An analogous sealing arrangement is provided around the outer periphery of a driven hub 156 that is similar in construction to the driving hub 136 and is carried upon the driven shaft 126 by having said shaft received within a central axially extending bore 158, whereupon rotation of the hub 156 will result in concomitant rotation of the shaft 126. The hub 156 includes a radially outwardly extending section 160 which cooperates with the section 140 of the driving hub 136 in supporting the clutching mechanism of the present invention in a manner hereinafter to be described.

As shown in FIG. 3, disposed between the radially outwardly extending sections 140 and 160 of the driving and driven hubs 136 and 156 is a plurality of annular clutch plate carrying rings generally designated by the numerals 164, 166, and 168. The rings 164, 166, 168 are arranged concentrically of the axis of the input and output shafts 124 and 126 and are arranged in axially abutting relationship as shown. The rings 164, 166 168 are provided with radially outwardly extending flanges 170 at their axially abutting edges which flanges 170 are secured together by a plurality of circumferentially spaced axially extending suitable screws, bolts or the like 172 and nuts 174 to provide an annular unitized structure. The ring 164 is also provided with a radially outwardly extending flange or shoulder 176 which is adapted to be connected by a plurality of circumferentially spaced screws, bolts or the like 178 to the radially outwardly extending section 160 of the driven hub 156, the bolts 178 extending through suitable axially extending bores 180 in the section 160 and being threadably engaged within suitable threaded blind bores 182 in the flange 176. It should be noted that the axial length of the unitized assembly consisting of the plate carrying rings 164, 166, 168 may be varied by adding or removing additional rings, such as the intermediate ring 166 whereby to vary the capacity of the clutch unit 22 of the present invention as will be apparent to those skilled in the art.

The inner periphery of the assembly consisting of the plate carrying rings 164, 166 and 168 defines an annular surface which is formed with a plurality of circumferentially spaced, axially extending and radially inwardly projecting ribs or splines, generally designated by the numeral 184. The splines 184 are adapted to carry a plurality of radially inwardly extending clutch plates 186, each of which is formed with a plurality of recesses or notches around the outer periphery thereof adapted for keyed engagement with the plurality of splines 184, whereby the plates 186 are adapted to rotate concomitantly with the support rings 164, 166 and 168 and be axially or longitudinally slidable along the splines 184 for purposes hereinafter to be described.

Disposed radially inwardly from the plurality of clutch plates 186 is a clutch disc assembly generally designated by numeral 188. The assembly 188 comprises a clutch disc support member or clutch hub 190 that is arranged coaxially of the shafts 124, 126 and includes a radially outwardly extending section 191 disposed adjacent the section 140 of the support collar 136 and secured thereto in a manner hereinafter to be described. The clutch hub 190 is formed with a plurality of axially extending, circumferentially spaced bores or fluid passages, generally designated by the numeral 192, which, as seen in FIG. 3, are communicable via a plurality of axially and circumferentially spaced discharge ports 192a with the radially outermost portion of the clutch hub 190. The passages 192 are adapted to be communicable with the aforedescribed radial bores 150 whereby cooling fluid may be communicated from the aforementioned source thereof to the plurality of clutch discs and plates. The clutch hub 190 is operatively secured to the section 140 of the driving hub 136 by means of a plurality of axially extending, circumferentially spaced screws, bolts or the like representatively designated by the numeral 194, in FIG. 3, whereby the clutch hub 190 will rotate concomitantly with the driving hub 136 and driving shaft 124 relative to the driven hub and shaft 156, 126, respectively, when the clutch unit 22 of the present invention is deactuated.

In accordance with the principles of the present invention, the plurality of keyways 196 are adapted to carry a series of clutch discs generally designated by the numeral 198 which are interleaved between the plurality of clutch plates 186 carried upon the splines 184. Preferably each of the clutch discs 198 comprises a plurality of circumferentially extending disc segments, each of the segments extending circumferentially between and being supported by pairs of adjacent axially extending keyways 196. Each of the disc segments 198 comprises a plate-like body member having opposed surfaces which are adapted for cooperation with the adjacent clutch plates to provide the clutching action achieved by the unit 22 of the present invention.

In one preferred construction of the present invention, the plurality of disc segments 198 are fabricated with a steel core upon which bronze facings have been sintered. The faces are preferably, although not necessarily, formed with suitable grooves which produce lands that are in the shape of small parallelograms which act similar to minute hydro-dynamic bearings in the presence of controlled oil flow and function to maintain a thin, but positive, oil film between the confronting faces of the disc segments 198 and associated plates 186, and it is the shearing of this oil film which transmits torque between the plates 186 and discs 198, and hence between the driving shaft 124 and driven shaft 126 during operation of the clutch unit 22.

In order to effect actuation of the clutch unit 22, an annular piston member 200 is provided adjacent the end of the clutch hub 190 opposite the end section 191 thereof. The piston member 200 is provided with an actuating surface, generally designated by the numeral 202, which is adapted to move axially of the hub 190 upon actuation of the unit 22 in order to effect clutching action of the clutch discs and plates. The piston member 200 also includes a generally axially extending annular surface 204 which is engageable by a suitable fluid sealing means 206 carried on the hub 190, with a similar axially extending annular surface 208 cooperating with sealing means 210 to define a piston chamber hereinafter to be described. The piston member 200 is retained upon the hub 190 by means of an annular retaining ring 212 which defines an annular recess 214 that is communicable with a fluid passage 216 and with the aforementioned piston chamber which is representatively designated by the numeral 218. The passage 216 is communicable with a suitable source of pressurized actuating fluid supplied by servo relief valve 72, which is communicable via suitable fluid passage means in the driven hub 136, and when the pressure of such fluid is increased to a predetermined magnitude, the piston member 132 will move axially toward the right in FIG. 3, thereby causing the clutch discs and plates to move into clutching relationship to effect a driving connection between the driving shaft 124 and the driven shaft 126. It is to be noted that if desired de-actuation of the unit 22 may be achieved by properly and selectively pressurizing the righthand end of the piston chamber 218 (through suitable fluid passages connecting to a source of pressurized fluid) or alternatively, appropriate retraction springs (not shown) or other suitable piston retracting means may be used as will be appreciated by those skilled in the art.

One particularly important feature of the present invention, and which is also incorporated in U.S. Pat. No. 3,722,645, resides in the simplicity with which the clutch unit 22 may be serviced without disturbing the associated machinery, i.e., source of motive power and drive pinions. In particular, access to the plurality of clutch discs and plates is accomplished through the provision of a plurality of axially extending internally threaded bores 220 formed in the end of the ring 168 and which are circumferentially and axially aligned with a cooperable series of bores 222 formed around the periphery of the section 191 of the clutch hub 190. It will be seen that in the normal operating configuration of the clutch unit 22, the axially outer end 224 of the ring 164 is nestingly received within an annular recess or shoulder 226 on the radially outwardly extending section 160 of the driven hub 156. At such time as it is desired to provide access to the clutch discs and plates, the plurality of bolts 178 are removed and a plurality of screws, bolts or the like (not shown) are inserted through the bores 222 and threaded into the bores 220. As such bolts are threadably advanced, the entire assemblage consisting of the rings 164, 166, 168 is axially drawn or biased to the right in FIG. 1 so that the end 224 of the ring 164 is moved off of the shoulder 226. After the plurality of rings 164, 166, 168 are properly supported, i.e., by means of a suitable sling or the like, the plurality of bolts 194 may be removed, at which time the entire clutch assembly, including the clutch hub 190, clutch discs and plates and rings 164, 166 and 168 may be removed from between the driving hub 136 and driven hub 156, for purposes of repair, replacement, inspection, etc. Replacement or reinsertion of the entire aforesaid assemblage may be conveniently accomplished by merely reversing this operation.

The operation and control of the driven system of the present invention is best seen with reference to FIGS. 1 and 2 and will be explained with reference thereto.

In order to actuate the drive system, it is first necessary to energize the oil pump or pumps 84, 86 which operate to supply control fluid and to circulate lubricating fluid through clutches 22 and 24 and heat exchangers 92 and 93. Suitable interlocks may be included to prevent further actuation of the system until such time as full fluid flow through the system is established.

Once the lubricating and control fluid system have reached normal operating conditions, the synchronous motors 26 and 28 may be started in a conventional manner. Preferably, the controls will be provided with an interlock system whereby the motors are started sequentially, one being allowed to reach full synchronous speed before starting of the other.

Once both motors have reached full synchronous speed and control and lubricating fluid flow systems are operating normally, the speed servo control circuit 60 may be actuated to apply a signal to each of the valve amplifiers 68, 70 which in turn will actuate servo relief valves 72 and 74 to begin applying control fluid pressure to respective clutches 22 and 24 thereby actuating the clutches. As clutches 22 and 24 are actuated, the rotational forces generated by motors 26 and 28 will be transmitted to gear wheel 16 via drive pinions 18 and 20 connected to the respective output shafts 40 and 228 thereby causing accelerating rotation of drum 12. The rate of acceleration of drum 12 will be controlled directly by the rate of increase of actuating pressure applied by servo relief valves 72 and 74 which in turn are controlled by the speed servo control circuit 60. Preferably, the speed servo control circuit 60 will be programmed to provide a relatively steep acceleration ramp bringing drum 12 up to approximately 90-95% of full speed within about 15-20 seconds. Thereafter, actuation pressure will be maintained so as to hold drum speed at 90-95% full speed for a period of time after which the control pressure will be increased gradually until drum 12 reaches full operating speed.

During the initial acceleration period of drum 12 up to 90-95% of full operating speed, power sensors 42 and 44 will monitor power consumption of the respective motors 26 and 28 and supply signals to each of load sharing circuits 46 and 48. Load sharing circuits 46 and 48 will monitor any differential in power consumption of either of the motors and operate to signal the corresponding valve amplifier 68 or 70 to reduce the control fluid pressure applied by servo relief valve 72 and 74 to the clutch associated with the motor having the higher current draw and hence higher load. Thus, load sharing circuits 46 and 48 will operate to maintain substantially equal loading of the respective motors during the acceleration period. Preferably, the load sharing circuits will be designed to allow for up to a 3% differential in power consumption between motor loading.

The rapid initial acceleration is desirable as it is this time period during which maximum clutch slippage is encountered and hence the maximum heat generation is encountered. Accordingly, a relatively steep acceleration curve will allow the use of smaller size lubricating fluid coolers.

Preferably, load sharing circuits 46 and 48 will only operate to balance loading between drive motors 26 and 28 during the acceleration phase although should it be desired these circuits could be designed to provide continuous monitoring of system loading.

It should also be noted that power sensors 42 and 44 will provide continuous monitoring of respecitve motors 26 and 28, the signal therefrom being supplied to the torque limiting circuits 52 and 54. Thus, in the event of overloading such as a partial system failure, the torque limiting circuits will operate to disengage the respective clutches 22 and 24.

If desired, once full operating speed of the drum 12 has been reached, the load sharing circuits may continue to monitor power consumption of the respective motors so as to maintain loading thereof within a 3% differential. In the event a loading differential is encountered of a magnitude greater than the 3% differential, the load sharing circuit will signal the valve amplifier which in turn will cause the servo relief valve to reduce actuating pressure to the clutch moving it out of lock up and into a slip condition until equal loading is obtained. The load sharing signal will also be fed into a master control circuit 41. Once the motor loads have been equalized, master control circuit 41 will signal valve amplifiers 68 and 70 and servo relief valve 72 and 74 to increase actuating pressure to bring the respective clutches 22 and 24 back into lock up or zero slip. Master control circuit 41 is designed to repeat this cycle up to three times in order to achieve clutch lock up with substantially equal loading. In the event equal loading at clutch lock up is not achieved after the third cycle a fault signal will be generated and the clutches disengaged so that other corrective action may be taken.

Once full operating speed has been achieved under balanced motor loading and with the clutches in a lock up or nonslip condition, it is desirable to adjust the actuating pressure on the clutches so as to provide overload protection for the system. As these clutches have a higher static coefficient of friction than dynamic coefficient of friction and it is the static coefficient of friction which must be overcome in order for the clutches to begin slipping any overload control must be referenced to the static coefficient of friction under the particular operating conditions.

In order to accomplish this, master control circuit 41 is programmed to reduce actuating pressure to each of the clutches 22 and 24 while maintaining equal loading of the motors until the clutches just begin to slip. In order to sense clutch slippage, motor output shaft speed is sensed by pulse tachometers 30 and 32 the output of which is fed to master control circuit 41 and the clutch output shaft speed is sensed by pulse tachometer 38, the output of which is also fed to the master control circuit. Thus, clutch slippage may be determined by a comparison of the respective signals. Pressure transducers 76 and 78 will provide a signal of the pressure at which slippage occurs to the master control circuit.

As soon as the clutches begin to slip, the master control circuit will signal the valve amplifiers controlling each of the servo relief valves to begin increasing actuating pressure. The master control circuit will continue to signal an increase in actuating pressure up to a predetermined level above the sensed pressure at which slippage occurred, typically about 10-20% thereby bringing clutches back into lockup and providing a controlled overload factor. This means that if for any reason mill load increases by a factor greater than the predetermined overload factor the clutches will begin to slip. If the clutches should start to slip due to higher mill loading but the loading is still within the normal acceptable range, the master control circuit may be programmed to sense the slippage and signal the valve amplifier to increase actuating pressure to bring the clutches back into lockup after which the above cycle will be repeated so as to adjust the actuating pressure to a level which will provided the same predetermined overload torque transmitting capability. Preferably, this cycle will also be repeated periodically at predetermined time intervals so as to adjust for any system variations.

As previously mentioned, each of the torque limiting circuits also includes settable means operative to provide a maximum limit torque which may be transmitted by the drive system so as to prevent potential damage to the equipment. This feature is primarily designed to a safety backup system in the event other portions of the control circuit fail. Thus, the torque limiting circuits will disengage the clutches in the event the loading on the motors exceeds a predetermined maximum magnitude for the system.

Speed servo control 60 is also operative to control mill shutdown. In response to a stop signal to speed servo control 60, it will signal valve amplifiers 68 and 70 to decrease actuating pressure to the clutches thus moving them out of lockup and into a slip condition. As actuating pressure is further decreased and clutch slip increased, the mill will decelerate at a controlled rate which will result in a minimum of pendulum action.

In order to further reduce the stopping time required to bring the mill to a full shutdown, pendulum damping circuit 62 is provided which received a signal from pulse tachometer 38 associated with clutch output shaft 40 indicating both the speed and direction of rotation thereof. As soon as backward or reverse rotation of the mill is sensed, the pendulum damping circuit 62 will signal valve amplifiers 68 and 70 to apply actuating pressure to the clutch. The clutch will then operate to provide a forward driving torque to the mill countering the reverse rotation thereof. As soon as reverse rotation ceases, pendulum damping circuit 62 will deactivate valve amplifiers 68 and 70 releasing the actuating control pressure and thereby disengaging the clutch. This cycle will be repeated until such time as no further reverse rotation is sensed by pendulum damping circuit 62.

During the operation of the mill, when the clutches are selectively and progressively deactivated the loaded mill decelerates rapidly until it comes to a halt, held against the load by a slight torque through the clutches. Upon further deactivation of the clutches the mill slowly runs back, under the load. When the load is at bottom center, total deactivation of the clutches will then apply the clutch brakes to hold the mill at a standstill. Stopping the mill in this controlled fashion can save time during stops. In the case of an unloaded mill, which tends to free wheel more readily, the braking capacity of the clutches can be made sufficient to significantly reduce mill roll-down time, by acting as a retarder as well as a holding brake.

In order to perform various types of maintenance operations on the mill, it is desirable to provide a positioning control means having the capability to rotate the drum of the mill through only a portion of a cycle. This may be accomplished by the control system of the present invention in either of two operational modes, namely an aborted start or pulsed inching.

In the aborted start operational mode, the same procedure is followed as described above with respect to mill startup. However, when the mill has reached the desired angular position, speed servo control 60 signals valve amplifiers 68 and 70 to release the actuating pressure thereby fully disengaging the clutches. Thereafter, pendulum damping circuit 62 is actuated to bring the mill to a full stop in the desired angular position.

If desired, pulsed inch circuit 64 may be employed in order to reposition the mill. Pulsed inch circuit 64 operates in conjunction with speed servo control 60 to cyclically signal valve amplifiers 68 and 70 to apply cyclical actuating pressure to clutches 22 and 24 so as to effect repetitive relatively short engagement thereof until the mill has been moved to the desired angular position. Pulsed inch circuit 64 will receive a series of pulses from pulse tachometer 38 provided on the clutch output shaft 40 thereby providing a feed back as to the change in angular position of the mill. If desired, a suitable selector switch may be provided to allow automatic selection of the number of degrees advancement or the new angular position of the mill.

The master control circuit 41 may be in the form of suitable control circuitry preferably of the solid state type or a suitably programmed microprocessor may be employed.

The use of clutches of the oil shear type can obviate the need for shear pins or other like safety devices by continuously or periodically monitoring within relatively close limits the working torque during normal running. Twin mill drives using quadratorque motors can particularly benefit in this respect as it is the possibility of the motors being out of phase which introduces the greatest risk of the occurrence of destructive overload. In systems even using standard synchronous motors the motor torque produced under electrical fault conditions can be sufficiently high that use of the present invention is beneficial with regard to limiting the maximum torque.

In general, the limiting torque value selected for the clutches is a function of the equivalent failure torque of the weakest portion of the drive train. As an example in the case where the gear teeth are selected as being the weakest link, a value of limiting torque of approximately 2.5 of full load torque might be appropriate.

It will be appreciated that other functioning modes of the present arrangement using the inching or the deceleration capability of the clutches can apply also to installations having a single drive motor.

In operation, by monitoring the electrical consumption of each of the motors 26 and 28 the state of balance between the loads carried by the motors can be determined. When a predetermined value of load out-of-balance occurs the method adopted for rebalancing the motor loads involves the steps of: reducing energization of the hydraulic clutches 22 and 24 to a sufficient extent that mill speed drops to about 95% of synchronous speed. This assures a condition of dynamic friction in the clutches, to avoid the uncertainties which would otherwise exist if a smaller value of slip was elected, wherein a non-sliding friction coefficient might apply part of the time. The loading of one clutch may then be varied in relation to the other clutch until the motor loads are balanced within the desired tolerance, at which time an acceleration schedule is adopted and the mill brought up to operating speed by modulating clutch control pressure in accordance with a desired acceleration schedule.

In referring to different types of clutches the terminology "wet clutch" and "dry clutch" refer respectively to clutches wherein the plates are liquid lubricated or dry, respectively. Of these types of clutches, some employ hydraulic controls, some employ pneumatic controls, or combinations of both.

In general it is contemplated that the precision of operation proposed in the present disclosure will more readily be achieved using hydraulic controls.

In the operation of the mill, in addition to utilizing the clutch brake or brakes for purposes of slowing or positioning the mill, when the mill has been brought to a standstill, controlled and limited energization of the clutch or clutches while the clutch brake is still fully engaged can usefully bring the electric drive motors to a halt. During such operation, the excess energy is dissipated through the clutch cooling system, care being taken that the clutch braking torque does not exceed the load holding capability of the clutch brake. Such operation facilitates servicing of the drive motors simultaneously with servicing of the mill per se.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

I claim:

1. A multiple drive system for driving a single rotational member comprising:
   first and second motor means;
   first and second clutch means for drivingly connecting said motor means to said rotational member; and
   control means for controlling operation of said first and second clutch means, said control means including first and second actuating means operative to apply fluid actuating pressure to said first and second clutch means respectively, speed control means operatively connected to said first and second actuating means, and load balancing means operatively connected to said first and second actuating means, said control means being operative to control said first and second actuating means so as to progressively increase said fluid pressure to said first and second clutch means at a predetermined rate whereby said rotational member may be accelerated from a standing condition and said load balancing means being operative to control said first and second actuating means so as to maintain substantially equal torque loading on said first and second motor means continuously during acceleration of said rotational member.

2. A multiple drive system as set forth in claim 1 wherein said control means further includes torque limiting means operative to limit maximum torque loading on said first and second motor means below a predetermined maximum.

3. A multiple drive system as set forth in claim 2 further including first and second power sensing means each operative to generate a signal proportioned to the power consumption of said first and second motor means respectively, said signal being supplied to the input of said torque limiting means.

4. A multiple drive system as set forth in claim 3 wherein said torque limiting means has an output connected to said actuating means, said torque limiting means being operative to signal said first and second actuating means to reduce actuating pressure on respective of said first and second clutch means in response to said signal exceeding a predetermined magnitude.

5. A multiple drive system as set forth in claim 4 wherein said first and second power means are wattmeters connected to the power supply to respective of said first and second motor means.

6. A multiple drive system as set forth in claim 1 wherein said load balancing means includes first and second power sensing means each operative to generate a signal proportioned to the power consumption of said first and second motor means, said load balancing means being operative to control said first and second actuating means so as to reduce fluid actuating pressure to a selected one of said first and second clutches in response to a differential between said signals from said first and second power sensing means.

7. A multiple drive system as set forth in claim 3 wherein said first and second power sensing means are wattmeters connected to the power supply to respective of said first and second motor means.

8. A multiple drive system as set forth in claim 1 wherein said speed control means is operative to accelerate said rotational member at first predetermined rate up to between 90% and 95% of full speed and to thereafter accelerate said rotational member from about 90% to 95% up to full speed at a second predetermined rate.

9. A multiple drive system as set forth in claim 8 wherein said speed control means includes speed sensor means connected to the output shaft of one of said first and second clutch means and operative to generate a signal proportioned to the speed of said output shaft.

10. A multiple drive system as set forth in claim 1 further comprising master control circuit means connected to said actuating means and operative to control said actuating means so as to apply a fluid actuating pressure to each of said first and second clutch means of a predetermined magnitude, said predetermined magnitude being greater than the minimum actuating pressure at which said first and second clutches just begin to slip.

11. A multiple drive system for driving a single rotational member comprising:

first and second motor means;

first and second clutch means for drivingly connecting said motor means to said rotational member;

control means for controlling operation of said first and second clutch means, said control means including first and second actuating means operative to apply fluid actuating pressure to said first and second clutch means respectively, speed control means operatively connected to said first and second actuating means; and load balancing means operatively connected to said first and second actuating means, said control means being operative to control said first and second actuating means so as to progressively increase said fluid pressure to said first and second clutch means at a predetermined rate whereby said rotational member may be accelerated from a standing condition and said load balancing means being operative to control said first and second actuating means so as to maintain substantially equal torque loading on said first and second motor means continuously during acceleration of said rotational member; and master control circuit means connected to said actuating means and operative to control said actuating means so as to apply a fluid actuating pressure to each of said first and second clutch means of a predetermined magnitude, said predetermined magnitude being greater than the minimum actuating pressure at which said first and second clutches just begin to slip;

fluid pressure sensing means for sensing actuating fluid pressure applied to each of said first and second clutch means connected to said master control circuit means;

first speed sensing means for measuring the speed of each of said first and second motor means and connected to said master control circuit means;

second speed sensing means for measuring the rotational speed of said rotating member and connected to said master control circuit means, said master control circuit means being operative to determine a minimum actuating pressure by reducing fluid actuating pressure until said first speed sensing means senses a speed slightly greater than the speed sensed by said second speed sensing means and thereafter being operative to increase fluid actuating pressure to increase actuating pressure to said predetermined magnitude, said predetermined magnitude being substantially equal to a predetermined percentage greater than said minimum actuating pressure.

12. A multiple drive system as set forth in claim 11 wherein said predetermined percentage is approximately 10 percent.

13. A multiple drive system as set forth in claim 11 wherein said first and second speed sensing means are pulse tachometers.

14. A multiple drive system as set forth in claim 1 further comprising inch control means having an output connected to said speed control means and operative to selectively control said speed control means whereby said rotating member may be rotated through a predetermined angular displacement.

15. A multiple drive system as set forth in claim 14 further comprising speed sensing means connected to the output shaft of one of said first and second clutches, said speed sensing means having an output connected to said inch control means whereby said control means may determine the angular displacement of said rotating member.

16. A multiple drive system as set forth in claim 14 wherein said inch control means is operative to supply pulsed signals to said speed control means, said pulsed signals being operative to actuate and deactuate said speed control means whereby said rotating member may be rotated through said predetermined angular displacement.

17. A multiple drive system as set forth in claim 1 further comprising pendulum damping circuit means connected to each of said actuating means and operative to selectively control said actuating means so as to engage said first and second clutch means when said rotating member is rotating in a first direction and to disengage said first and second clutch means when said rotating member is rotating in another direction.

18. A multiple drive system for driving a single rotational member comprising:
first and second motor means;
first and second clutch means for drivingly connecting said motor means to said rotational member;
control means for controlling operation of said first and second clutch means, said control means including
first and second actuating means operative to apply fluid actuating pressure to said first and second clutch means respectively,
speed control means operatively connected to said first and second actuating means; and
load balancing means operatively connected to said first and second actuating means,
said control means being operative to control said first and second actuating means so as to progressively increase said fluid pressure to said first and second clutch means at a predetermined rate whereby said rotational member may be accelerated from a standing condition and said load balancing means being operative to control said first and second actuating means so as to maintain substantially equal torque loading on said first and second motor means continuously during acceleration of said rotational member; and
pendulum damping circuit means connected to each of said actuating means and operative to selectively control said actuating means so as to engage said first and second clutch means when said rotating member is rotating in a first direction and to disengage said first and second clutch means when said rotating member is rotating in another direction; and
rotational direction sensing means connected to the output shaft of one of said first and second clutches and being connected to an input of said pendulum damping circuit.

19. A multiple drive system as set forth in claim 18 wherein said rotational direction sensing means comprises a pulse tachometer.

20. In a drive system comprising motor means, a rotatable member, clutch means drivingly connecting said motor means to said rotatable member, actuating means for applying fluid pressure to said clutch means to engage said clutch, and control means for controlling the operation of said actuating means, inching means for rotating said rotational member through a selected angular displacement comprising inch control circuit means having an output connected to said control means and speed sensing means connected to said output shaft of said clutch, said speed sensing means having an output connected to said inching means and operative to generate a signal proportionate to the speed of said output shaft, said inch control circuit means being operative to actuate said control means so as to move said clutch means into engagement thereby accelerating said output shaft, and deactuating said control means so as to disengage said clutch a time period thereafter, said time period being controlled by said inch control means so as to move said rotational member through said predetermined angular displacement.

21. In a drive system comprising motor means, a rotatable member, clutch means drivingly connecting said motor means to said rotatable member, actuating means for applying fluid pressure to said clutch means to engage said clutch, and control means for controlling the operation of said actuating means, inching means for rotating said rotational member through a selected angular displacement comprising inch control circuit means having an output connected to said control means and speed sensing means connected to said output shaft of said clutch, said speed sensing means having an output connected to said inching means and operative to generate a signal proportionate to the speed of said output shaft, said inch control circuit means being operative to actuate said control means so as to move said clutch means into engagement thereby accelerating said output shaft, and deactuating said control means so as to disengage said clutch a time period thereafter, said time period being controlled by said inch control means so as to move said rotational member through said predetermined angular displacement; and pendulum damping circuit means connected to said actuating means, and rotational direction sensing means connected to said output shaft, said rotational direction sensing means being operative to supply a signal to said pendulum damping circuit indicative of the direction of rotation of said output shaft and said pendulum damping circuit means being operative to actuate said actuating means so as to engage said clutch means in response to a first sensed direction of rotation of said shaft and to disengage said clutch means in response to rotation of said shaft in the other direction whereby said clutch means assists in stopping pendulum motion of said rotatable member.

22. In a drive system comprising motor means, a rotatable member, clutch means drivingly connecting said motor means to said rotatable member, actuating means for applying fluid pressure to said clutch means to engage said clutch, and control means for controlling the operation of said actuating means, torque limiting means connected to said actuating means and motor load sensing means having an output connected to said torque limiting means, said torque limiting means being operative to deactivate said actuating means in response to motor loading greater than a predetermined maximum.

23. In a drive system comprising motor means, a rotatable member, clutch means drivingly connecting said motor means to said rotatable member, actuating means for applying fluid pressure to said clutch means to engage said clutch, and control means for controlling the operation of said actuating means, master control circuit means connected to said actuating means and operative to determine the magnitude of actuating fluid pressure at which said clutch means just beings to slip and to control said actuating means so as to apply a fluid actuating pressure to said clutch means of a determined magnitude, said determined magnitude being a fixed percentage greater than the minimum actuating pressure at which said clutch means just begins to slip.

24. In a drive system comprising motor means, a rotatable member, clutch means drivingly connecting said motor means to said rotatable member, actuating means for applying fluid pressure to said clutch means to engage said clutch, and control means for controlling the operation of said actuating means, master control circuit means connected to said actuating means and operative to determine the magnitude of actuating fluid pressure at which said clutch means just begins to slip and to control said actuating means so as to apply a fluid actuating pressure to said clutch means of a determined magnitude, said determined magnitude being a fixed percentage greater than the minimum actuating pressure at which said clutch means just begins to slip and fluid pressure sensing means for sensing actuating fluid pressure applied to each of said clutch means connected to said master control circuit means;

first speed sensing means for measuring the speed of each of said motor means and connected to said master control circuit means;

second speed sensing means for measuring the rotational speed of said rotating member and connected to said master control circuit means, said master control circuit means being operative to determine a minimum actuating pressure by reducing fluid actuating pressure until said first speed sensing means senses a speed slightly greater than the speed sensed by said second speed sensing means and thereafter being operative to increase fluid actuating pressure to increase actuating pressure to said predetermined magnitude, said predetermined magnitude being substantially equal to a predetermined percentage greater than said minimum actuating pressure.

25. A drive system as set forth in claim 24 wherein said first and second speed sensing means are pulse tachometers.

26. A multiple drive system for driving a single rotational member comprising:

first and second motor means;

first and second clutch means each having an input shaft connected to respective of said motor means and an output shaft drivingly connected to said rotatable member;

first and second load sensing means for sensing loading on respective of said first and second motor means;

first and second speed sensing means connected to respective output shafts of said first and second motor means;

third speed sensing means connected to one of the output shafts of said first and second clutch means;

first and second actuating means for applying a controlled fluid pressure to respective of said first and second clutch means so as to move each of said clutch means into and out of engagement;

speed control means having an output connected to said actuating means an input connected to said third speed sensing means and being operative to cause said actuating means to progressively increase fluid pressure to said first and second clutch means so as to accelerate said rotatable member at a predetermined rate;

load balancing circuit means receiving an input from each of said first and second load sensing means and an output connected to each of said first and second actuating means and operative to control each of said first and second actuating means so as to maintain loading on said first and second motor means within a predetermined differential, during acceleration of said rotatable member;

torque limiting circuit means receiving an input from each of said first and second load sensing means and having an output connected to said actuating means, said torque limiting circuit means being operative to control said actuating means so as to disengage respective of said first and second clutch means in response to respective motor loading greater than a predetermined maximum;

first and second pressure sensing means for sensing actuating pressure applied to respective of said first and second clutch means; and master control circuit means having inputs connected to each of said first and second pressure sensing means and outputs connected to each of said first and second actuating means, said master control means being operative to determine the magnitude of actuating pressure for each of said first and second clutch means at which the speed of said first and second motor output shafts begins to exceed the speed of said clutch output shaft and to control said actuating means so as to apply an actuating pressure to said first and second clutch means equal to a predetermined percentage greater than said magnitude of actuating pressure.

27. A multiple drive system as set forth in claim 26 further comprising inch control means having an output connected to said speed control means and operative to selectively control said speed control means whereby said rotating member may be rotated through a predetermined angular displacement.

28. A multiple drive system as set forth in claim 27 wherein said inch control means is operative to supply pulsed signals to said speed control means, said pulsed signals being operative to actuate and deactuate said speed control means whereby said rotating member may be rotated through said predetermined angular displacement.

29. A multiple drive system as set forth in claim 26 further comprising pendulum damping circuit means connected to each of said actuating means and operative to selectively control said actuating means so as to engage said first and second clutch means when said rotating member is rotating in a first direction and to disengage said first and second clutch means when said rotating member is rotating in another direction.

30. A multiple drive system as set forth in claim 29 further comprising rotational direction sensing means connected to the output shaft of one of said first and second clutches and being connected to an input of said pendulum damping circuit.

31. A multiple drive system as set forth in claim 30 wherein said first direction is opposite to the direction in which said motor means is operative to drive said rotational member.

32. A multiple drive system as set forth in claim 2 wherein said torque limiting means has an output connected to each of said actuating means and is operative to limit torque loading on said motor means by controlling actuation of said clutch means.

* * * * *